United States Patent
Algiene

(10) Patent No.: US 7,063,255 B2
(45) Date of Patent: Jun. 20, 2006

(54) CARD DISPLAY SYSTEM AND METHOD

(75) Inventor: Kenneth Algiene, Littleton, CO (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/803,814

(22) Filed: Mar. 17, 2004

(65) Prior Publication Data

US 2005/0205663 A1  Sep. 22, 2005

(51) Int. Cl.
*G06K 5/00* (2006.01)

(52) U.S. Cl. .................... 235/380; 383/72; 383/100; 383/101

(58) Field of Classification Search ............... 235/380, 235/486, 487; 206/461; 383/72, 100, 101
See application file for complete search history.

(56) References Cited

U.S. PATENT DOCUMENTS

| | | | |
|---|---|---|---|
| 4,829,168 A | 5/1989 | Nakahara | |
| 5,720,158 A | 2/1998 | Goade, Sr. | |
| D396,882 S | 8/1998 | Neal, Jr. | |
| 5,918,909 A | 7/1999 | Fiala et al. | |
| 5,921,584 A | 7/1999 | Goade, Sr. | |
| D429,733 S | 8/2000 | Jones et al. | |
| D436,991 S | 1/2001 | Morgante | |
| D457,556 S | 5/2002 | Hochschild | |
| 6,471,127 B1 | 10/2002 | Pentz et al. | |
| 6,543,809 B1 | 4/2003 | Kistner et al. | |
| 6,588,658 B1 | 7/2003 | Blank | |
| 2002/0027837 A1 | 3/2002 | Weber | |
| 2002/0185543 A1 | 12/2002 | Pentz et al. | |
| 2003/0010829 A1 | 1/2003 | Krygier | |
| 2003/0150762 A1* | 8/2003 | Biller | 206/461 |
| 2005/0061889 A1* | 3/2005 | McGee et al. | 235/487 |

FOREIGN PATENT DOCUMENTS

CA  2300241  9/2000

* cited by examiner

*Primary Examiner*—Daniel Stcyr
*Assistant Examiner*—Daniel A. Hess
(74) *Attorney, Agent, or Firm*—Townsend and Townsend and Crew LLP

(57) ABSTRACT

A system and method for displaying a presentation instrument such as a gift card, and for establishing and maintaining an account associated with the gift card. The gift card is packaged with a card carrier for display at a retail establishment, with both the card and the card carrier each having an account identifying element, such as a magnetic stripe or bar code. The identifying element on the card may be electronically read in order to conduct transactions against the account. The identifying element on the card carrier may be electronically read to activate the account, but not conduct transactions, thereby reducing the opportunity for fraudulent transactions against the account.

27 Claims, 2 Drawing Sheets

610 — 1234567891234 } ACCOUNT A
612 — 1234567891235
     1234567891236 } ACCOUNT B
     1234567891237
     1234567891238 } ACCOUNT C
     1234567891239
         ⋮

CARD DISPLAY SYSTEM AND METHOD

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

Stored value, gift, or other pre-paid metered accounts associated with debits cards are well-known for providing access to goods and services. For example, stored value or gift cards may be purchased from various merchants such as Target®, Wal-Mart®, Starbucks®, Sears®, Blockbuster®, and the like. Pre-paid debit cards are also frequently purchased for telephone services. The purchase and usage of pre-paid debit cards has continued to increase in recent years to the point that the sale of pre-paid debit cards today is a multi-billion dollar industry.

Pre-paid debit cards are often printed and issued with a predetermined balance and typically then sold as a retail item. An example of such a card is a pre-paid gift card which provides an individual with a set dollar amount for the purchase of goods from a particular merchant. The account is accessed and debited by using an account number provided on the gift card. A problem experienced in the sale of such pre-paid debit cards is that merchants buying these cards are subsequently more exposed to loss through damage and theft. As such, merchants in the past have stored such pre-paid debit cards under lock and key until the moment the cards are purchased. This has prevented stocking of such cards on store shelves freely accessible by prospective purchasers and increases merchant handling time and expenses. In addition, the merchant must maintain inventory stock of different values of these pre-paid debit cards well in advance of when the debit cards are actually sold as a retail item, thus restricting working capitol.

With these problems in mind, merchants are now more frequently displaying non-activated debit cards. Such debit cards are not useable until activated by the merchant, usually by reading a bar code, magnetic stripe or similar identifying element and thereby electronically activating the account by sending the account number stored on the identifying element to a centralized database where accounts for cards are maintained and activated. Each card may be for a set or face amount, or may have its account value established (and replenished) by the merchant after receiving payment from the customer and sending the payment amount to the database. Using non-activated cards, the merchant can readily provide unfettered access of such cards to prospective purchasers and reduce handling time and costs as theft is no longer a concern since the non-activated debit cards have no monetary value. Further, merchants no longer carry a large initial expenditure since the merchant activates the debit card with a balance representing an amount a consumer wishes to attribute to the debit card at the time the debit card is actually purchased by the consumer.

Typically, such non-activated debit cards are displayed and/or packaged for sale in a retail store by affixing the card to a card carrier. The card is typically affixed to the card carrier by adhesives or by inserting corners of the card into openings within the card carrier. Further, a hole may optionally be cut into the card carrier so that the card carrier may be hung on a display in a retail store. Such card packaging is often cumbersome in that the merchant has to first remove the card from the packaging in which the card is displayed in order to activate the card at the time the debit card is actually sold. This problem has been overcome by providing an identifying element on both the card carrier and the debit card. Thus the merchant need only read or scan the identifying element on the carrier, and after the card is purchased, the customer may remove the card and discard the carrier, thereafter using the identifying element on the card itself to conduct transactions against the card account.

Various card display packaging is described in U.S. Pat. Nos. 5,720,158, 5,918,909, 5,921,584, and 6,543,809. Credit card like structures are described in U.S. Pat. Nos. 4,829,168, 6,471,127, 6,588,658, D-396,882, D-429,733, D-436,991, and D-457,556; U.S. Patent Publication Nos. 2002/0027837, 2002/0185543, and 2003/0010829; and Canadian Patent No. 2,300,241. The full disclosures of the each of the above patents and published patent applications are incorporated herein by reference.

BRIEF SUMMARY OF THE INVENTION

In embodiments of the present invention, a system and method is provided for displaying presentation instruments, such as debit/gift cards, and for establishing and maintaining accounts associated with such instruments.

In some embodiments, the system includes a presentation instrument associated with a debit account and a carrier for holding the instrument for display prior to purchase by a customer. The presentation instrument and the carrier each have an account identifier thereon for electronically identifying the debit account, the account identifier on the carrier for activating the account but not permitting transactions against the account, and the account identifier on the presentation instrument for conducting transactions against the debit account once the account has been activated.

In other embodiments, the system includes a card carrier for holding a presentation instrument and an identifying element on the card carrier. The identifying element is electronically read in order to activate the presentation instrument, and is arranged to be altered when the presentation instrument is removed from the carrier.

A more complete understanding of the present invention, including the forgoing and other embodiments, may be derived by referring to the detailed description of the invention and to the claims, when considered in connection with the Figures.

DETAILED DESCRIPTION OF THE INVENTION

Figure 1:
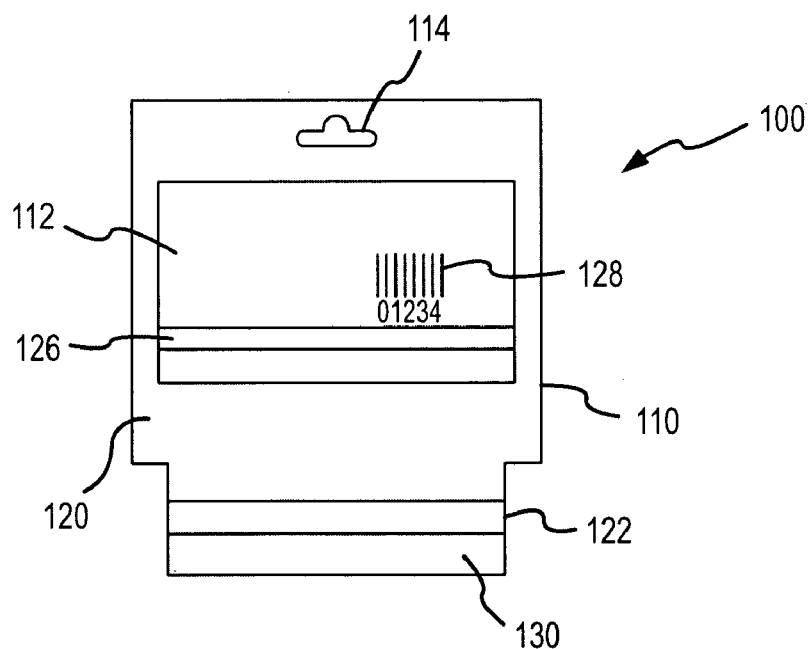
FIG. 1 is a rear view of a card display system, including a card carrier and gift card, in accordance with one embodiment of the present invention.

Referring to FIG. 1, there is seen a card display system 100 in accordance with the present invention. The system 100 includes a card carrier 110 that provides a display package for a card 112. The card 112 may be any kind of presentation instrument or financial card, such as debit card, stored value card, gift card or credit card. In the described embodiment, the card 112 is a gift card that has a predetermined cash value (e.g., $25), that is displayed at a retail merchant or other location for purchase, and that must be activated electronically by the merchant before it can be used to make purchases. The card carrier 110 includes an aperture 114 to permit the carrier to be hung at a retail location for display to customers.

FIG. 1 illustrates the rear of the card display system. In the illustrated embodiment, the card 112 may be secured to the carrier by suitable adhesive (not seen), permitting the card to be removed after purchase. Other constructions (not illustrated) are of course possible, such as the card carrier being made of light weight card board or paper that is folded over at the top (near the aperture 114) to provide a two layer construction with the card carried inside the carrier between the two layers of cardboard.

As seen in FIG. 1, the card carrier 110 and card 112 each have data storing or identifying elements, such as a magnetic stripe 122 on the card carrier 110, and a magnetic stripe 126 and/or bar code 128 on the card 112. As will be more fully described later, the identifying elements on the card 112 (e.g., magnetic stripe 126 or bar code 128) are used by a merchant (after the gift card has been activated) to identify the account associated with the card and to conduct transactions against that account. The identifying element on the card carrier 110 (i.e., magnetic stripe 122) is used to activate the gift card 112 when the card is purchased by a user or customer. Thus, for example, the magnetic stripe 122 can be swiped at a card reader to electronically read account information for the gift card account, to thereby activate the account and permit the card holder to subsequently use the card 112 for purchases. The card 112, when subsequently presented to a merchant for purchases, can also be swiped at a card reader to electronically read the account information (for the same account) stored on the magnetic stripe 126, or alternatively, the bar code 128 may be read by an optical scanner to obtain the account information.

As seen in FIG. 1, the card carrier 110 has a lower portion 130 on which the magnetic stripe 122 is located. The lower portion 130 has a lateral length which is the same as the lateral length of the card 112, so that the card carrier (with the card 112 still in position on the carrier) can be swiped at a card reader (for account activation) as if the card carrier were a card having standard card dimensions (a lateral length of approximately 3⅜ inches (85 mm), a height of approximately 2⅛ inches (54 mm), and a thickness of approximately 0.75 mm, pursuant to ISO standards). This permits the gift card account to be activated without removing the card.

Of course, the card carrier 110 and the card 112 may have identifying elements other than those illustrated, such as microchips, MICR codes, various forms of optically read printed/bar codes, and other conventional electronically readable elements.

While not seen in FIG. 1, it will be appreciated that the front of the card display system 100 may be printed with information to promote the card 112 when it is displayed at a retail merchant location, such as the name or logo of a retail establishment, the predetermined dollar amount or value of the card, and so forth. In addition, the front of the card carrier may be partially cut away so that when on display, the front of the card 112 (or a portion thereof) may be seen when viewing the front of the carrier.

Figure 2:
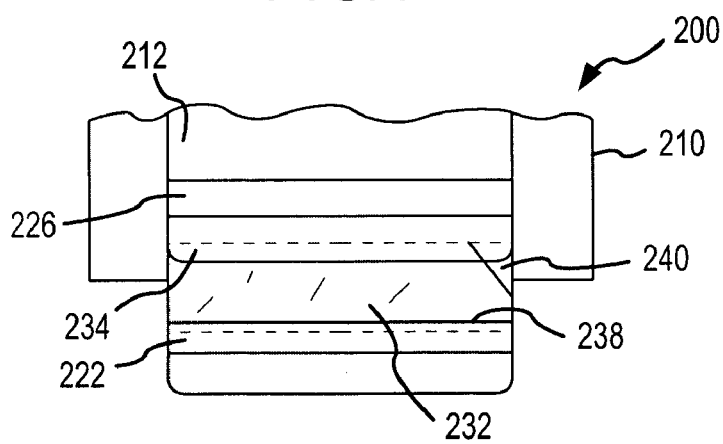
FIG. 2 is a partial view of a card display system, illustrating another embodiment of the invention.
Figure 3:
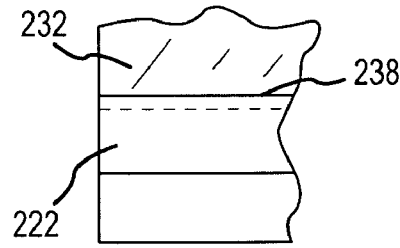
FIG. 3 is a partial, enlarged view of the card display system seen in FIG. 2.

Referring to FIGS. 2 and 3, there is illustrated, in accordance with another embodiment of the invention, the construction of a card display system 200, whereby a magnetic stripe 222 on a paper card carrier 210 is altered or destroyed when the card 212 is removed from the card carrier (i.e., after the magnetic stripe 222 has been read and the card 212 activated by a merchant). Such alteration or destruction prevents the carrier 210 (and its magnetic stripe 222) from being used to conduct unauthorized or fraudulent transactions (once discarded or otherwise separated from the card 212). In particular, a section of transparent adhesive tape 232 is placed on the card carrier 210, extending from the bottom edge 234 of the card 212 and down to the top edge 238 of the magnetic stripe 222. The tape 232 has a corner 240 without adhesive to permit the user to more easily remove the tape. The card 212, as conventional, is made of hard, glossy plastic material so that the tape readily peels away from the card. However, as the tape is removed from the paper card carrier, its adherence to the card carrier causes the card carrier to tear or pull apart so that the magnetic stripe 222 is physically altered or destroyed. As seen best in FIG. 3, the tape 232 is adhered only to (and slightly overlaps) the edge 238 of the magnetic stripe 222, so the tape does not interfere with the reading of the magnetic stripe 222 when the carrier (with card still attached) is swiped and activated by the merchant. However, the adherence of the tape to the top edge 238 of the magnetic stripe does provide assurance that, when the tape is peeled away so that the customer can remove the card 212, the magnetic stripe 222 will be sufficiently altered or damaged so that it cannot thereafter be electronically read. It should be appreciated that in the system just described, the account information stored on magnetic stripe 222 (on the carrier) and magnetic stripe 226 (on the card) could be the same.

Figure 4:
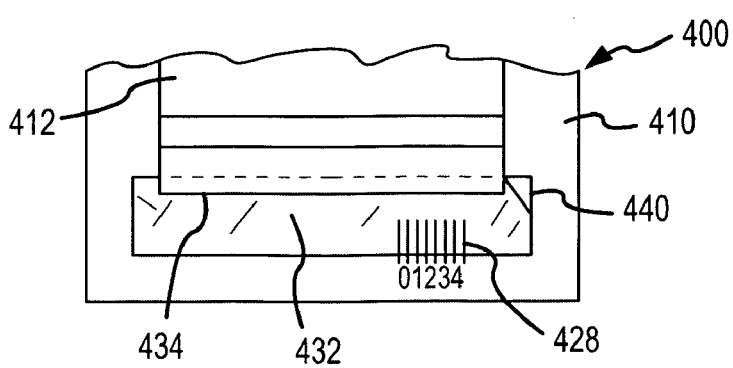
FIG. 4 is a partial view of a card display system, illustrating a further embodiment of the present invention.

Referring to FIG. 4, there is illustrated, in accordance with another embodiment of the invention, an alternative construction of a card display system 400, with a paper card carrier 410 of such system having a bar code 428 (rather than a magnetic stripe) which is read in order to activate the gift card account. A section of transparent adhesive tape 420 extends down from the lower edge 434 of the card 412 to cover at least a portion of the bar code 428. The tape 420 has a non-adhesive corner 440 (to facilitate removal), and when the tape 420 is peeled away, the bar code 428 is damaged or destroyed so as to no longer be readable.

Figures 5, 6:
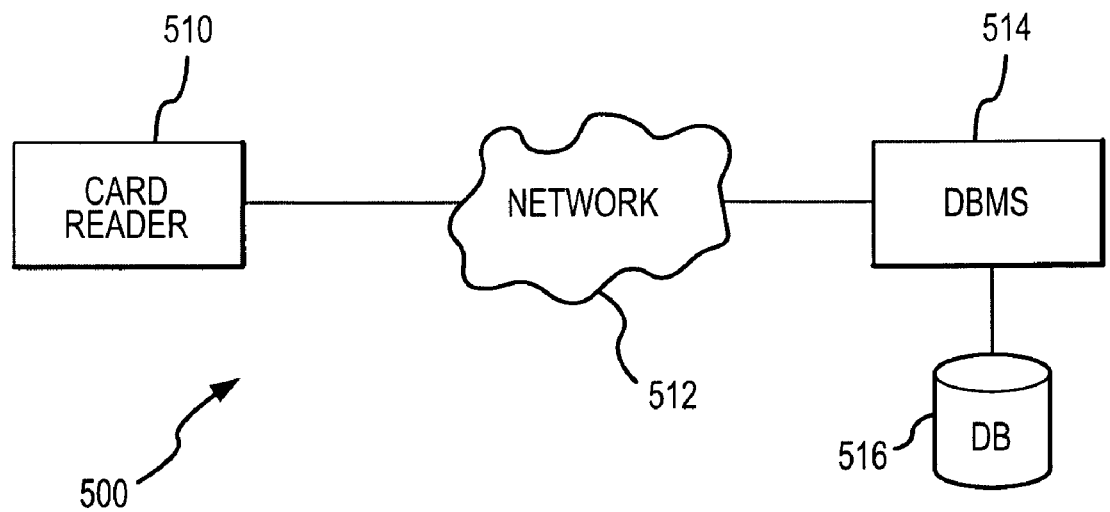
FIG. 5 illustrates a system for activating and using debit cards in accordance with a further embodiment of the present invention, including a database and database management system for managing account information.
FIG. 6 illustrates account information stored in the database of FIG. 5.

Referring to FIGS. 5 and 6, there is illustrated an arrangement, in accordance with yet another embodiment of the invention, wherein the account information on the magnetic stripe 122 of the card carrier 110 (FIG. 1) can only be used to activate the gift card account and cannot be used to conduct transactions against the account. In particular, in FIG. 5, a network 500 for managing gift card accounts includes a card reader 510 for reading account information (from card carriers and gift cards), and is connected by a network 512 to a database management system (DBMS) 514, which in turn is connected to a database 516 (where account information relating to each gift card account and transactions against that account are stored). The reader 510 is located at a retail establishment, and the network may be the internet or a dedicated network (provided by phone lines or other communications links) for connecting the retail establishment to the DBMS 514.

An illustration of account information for each gift card account is seen in FIG. 6 (such account information maintained and stored at the database 516 of FIG. 5). In particular, there is seen in FIG. 6, for each of three illustrated Accounts A, B and C, two sub account numbers, with one of the sub account numbers resident on the identifying element of the card carrier (e.g., at magnetic stripe 122 in FIG. 1) and the other sub account number resident on the identifying element of the card (e.g., at magnetic stripe 126 in FIG. 1). Thus, as an example, in FIG. 6 there is associated with Account A a first sub account number 610 (resident at or stored on the magnetic stripe 122 of the card carrier) and a second sub account number 612 (resident at or stored on the magnetic stripe 126 of the gift card).

When the first sub account number 610 is provided to the DBMS 514, the DBMS is programmed to know that it is from the card carrier associated with Account A, and the account is thereby activated. When the second sub account number 612 is provided (along with transaction data) to the DBMS 514, the system is programmed to know that it is associated with the same account (Account A), but is resident or stored only on the card itself, and will permit transactions to be conducted against that account (assuming that the account has already been activated, and the value of the card has not been exceeded). However, once the account is activated, should the first sub account number 610 (stored on the card carrier) be presented again, DBMS 514 will know that it cannot be used to conduct transactions against the account.

As illustrated in FIG. 6, this arrangement can be facilitated by having each first sub account number 610 and each second sub account number being one number count apart, with, for example, all the first sub account numbers 610 being even numbers and all the second sub account numbers 612 being odd numbers. Other arrangements are, of course possible, such as including an extra character on the magnetic strip (e.g., a marker digit) to indicate whether the magnetic stripe is on a card or on a card carrier.

It can be seen from the preceding discussion that the present invention provides a novel method and system for displaying a gift card and establishing and maintaining a gift card account. While detailed descriptions of presently preferred embodiments of the invention have been given above, various alternatives, modifications, and equivalents will be apparent to those skilled in the art without varying from the spirit of the invention. For example, the actual construction of the card carrier may take any number of forms and be made of any number of different materials. The card and card carrier could in fact be made from a single sheet of plastic or other material, with the card and card carrier separated (after activating the account) by tearing along perforations in the sheet of material. As yet another example, while the described embodiments envision the gift card having a monetary value predetermined before purchase by a customer or card holder, the gift card could be purchased for any amount chosen by the customer when initially activated, with such initial amount stored at the database 516, and with subsequent purchase transactions debited against such initial amount.

Therefore, the above description should not be taken as limiting the scope of the invention, which is defined by the appended claims.

What is claimed is:

1. A data card display system, comprising:
   a data card having a first machine readable identifying element thereon associated with a debit account in order to electronically identify the account and conduct transactions against the account; and
   a card carrier for holding the data card for display, the card carrier having a second machine readable identifying element associated with the account in order to electronically identify the account and activate the account for use by the cardholder,
   wherein the card carrier is constructed so that the second identifying element is physically altered at the time the data card is removed from the card carrier and by the act of removing the data card from the card carrier so that it cannot be read by a point of sale device, and is thereafter prevented from being used to conduct transactions.

2. The display system as in claim 1, wherein the data card is selected from the group consisting of a debit card, stored value card, gift card or credit card, wherein the data card is to be removed from the card carrier after activated, and wherein the card carrier is arranged to have the second identifying element electronically read prior to removal of the data card.

3. The display system of claim 2, wherein the identifying element on the card carrier and the identifying element on the data card each have information therein that distinguish the card carrier from the data card.

4. The system of claim 1, further comprising
   adhesive tape overlaying at least a portion of the data card and at least a portion of the second identifying element on the carrier, the tape for being removed in order to separate the data card from the carrier, and thereby physically altering the account identifier on the carrier.

5. A presentation instrument and carrier assembly, comprising: a presentation instrument associated with a debit account; and
   a carrier for holding the instrument for display prior to purchase of the presentation instrument by a customer;
   wherein the presentation instrument and the carrier each have an machine readable account identifier thereon for electronically identifying the debit account, the account identifier on the presentation instrument for conducting transactions against the debit account once the account has been activated, and the account identifier on the carrier for activating the account; and
   wherein the presentation instrument is to be removed from the carrier prior to being used to conduct transactions, and wherein the account identifier on the carrier is arranged to be physically altered at the time the presentation instrument is separated from the carrier and by the act of removing so that it cannot be read by a point of sale device and is thereafter prevented from being used to conduct transactions.

6. The assembly as in claim 5, wherein the presentation instrument is a card.

7. The assembly as in claim 6, wherein the card is a prepaid gift card.

8. The assembly as in claim 6, wherein the account identifier on the carrier comprises a magnetic stripe, and wherein the carrier is constructed so that when the card is separated from the carrier, the magnetic stripe is altered.

9. The assembly as in claim 8, wherein the magnetic stripe is altered by physically tearing the magnetic stripe.

10. The assembly as in claim 6, wherein the account identifier on the carrier comprises magnetic stripe with account information thereon, wherein the magnetic stripe further comprises identifying information thereon for identifying whether the magnetic stripe is associated with the card or with the carrier.

11. The assembly as in claim 5, wherein the account identifier on the presentation instrument and the account identifier on the carrier each have information associated with the debit account, and wherein the information on each is the same.

12. The assembly as in claim 5, wherein the account identifier on the presentation instrument and the account identifier on the carrier each have information associated with the debit account, and wherein the information on each is different.

13. Apparatus for holding a presentation instrument for display, comprising:
  a carrier for supporting the presentation instrument; and
  machine readable identifying element on the carrier, the machine readable identifying element for being electronically read in order to activate an account associated with the presentation instrument, the machine readable identifying element arranged to be altered at the time the presentation instrument is removed from the carrier and by the act of removing the presentation instrument from the carrier so that it cannot be read by a point of sale device so as to prevent its use for conducting unauthorized transactions.

14. A presentation instrument assembly, comprising:
  a first portion; and
  a second portion removably attached to the first portion;
  wherein the first portion and the second portion each have machine readable account identifier thereon for electronically identifying a stored value account, the machine readable account identifier on the first portion being a first account identifier for conducting transactions against the stored value account, and the machine readable account identifier on the second portion being a second account identifier for associating a stored value amount with the account; and
  wherein the second account identifier on the second portion is physically altered at the time the second portion is removed from the first portion and by the act of removing so that it cannot be read by a point of sale device in order to prevent further use of the second account identifier on the second portion.

15. The assembly of claim 14, wherein the account identifier on the second portion may be used to activate the account when associating a stored value amount with the account.

16. The assembly of claim 15, wherein the first portion comprises a presentation instrument.

17. The assembly of claim 16 wherein the presentation instrument is a gift card to be purchased by one person for a second person, and wherein the stored value account is a gift card account.

18. The assembly of claim 17, wherein the account identifier on the second portion may be used to load funds into the account when associating a stored value amount with the account, and wherein the loading of funds may occur after the identifier on the first portion has been used to conduct transactions.

19. The assembly of claim 18, wherein the first and second portions are formed from a single sheet of material, with perforations between the first and second portions used to separate the first and second portions after activation of the stored value account.

20. The assembly of claim 19, wherein the sheet of material is plastic.

21. The assembly of claim 20, wherein the second portion is a card carrier for use in displaying the gift card at a retail location.

22. The assembly of claim 17, wherein the assembly is configured for purchase of the gift card and activation of the account while the first and second portions are attached, where the second portion is configured for separation from the first portion after purchase, and where the second portion is configured to add additional value to the stored value account after being removed from the first portion.

23. A presentation instrument and carrier assembly, comprising:
  a presentation instrument associated with a debit account; and
  a carrier for holding the instrument for display prior to purchase of the presentation instrument by a customer;
  wherein the presentation instrument and the carrier each have machine readable account identifier thereon for being electronically read in order to electronically identify the debit account and thereby directly access the account within a database, the account identifier on the presentation instrument being a first account identifier for conducting transactions against the debit account once the account has been activated, and the account identifier on the carrier being a second account identifier for activating the account;
  wherein the first account identifier on the presentation instrument is a first sub-account number and wherein the second account identifier on the carrier is a second, separate and different sub account number, both first and second account numbers associated with the debit account in the database; and
  wherein the second account identifier is physically altered at the time the presentation instrument is removed from the carrier and by the act of removing so that it cannot be read by a point of sale device and cannot be used to conduct transactions against the account.

24. A presentation instrument and carrier assembly, comprising:
  a presentation instrument associated with a debit account; and
  a carrier for holding the instrument for display prior to purchase of the presentation instrument by a customer;
  wherein the presentation instrument and the carrier each have an machine readable account identifier thereon for electronically identifying the debit account, the account identifier on the presentation instrument being a first account identifier for conducting transactions against the debit account once the account has been activated, and the account identifier on the carrier being a second account identifier for activating the account but not permitting transactions against the account; and
  wherein both the first account identifier on the presentation instrument and the second account identifier on the carrier are visible in the assembly when the presentation instrument is held for display by the carrier
  and wherein the second account identifier is physically altered at the time the presentation instrument is removed from the carrier and by the act of removing so that it cannot be read by a point of sale device and cannot be used to conduct transactions against the account.

25. The assembly as in claim 24, wherein the account identifier is to be read by a terminal, which terminal may be used to either activate the account or conduct transactions against the account, and wherein the account identifier has information associated therewith in order to determine whether the account identifier being read is on the presentation instrument or on the associated camer.

26. The assembly as in claim 25, wherein the account has associated therewith first and second sub account numbers, the account identifier on the carrier including the first sub account number and wherein the account identifier on the presentation instrument including the second sub account number, and wherein use of the first sub account number permits the account to be activated, and wherein use of the second account number permits transactions against the account.

27. The assembly of claim 25, wherein at least one of the account identifiers on the presentation instrument and on the carrier has a marker digit to indicate whether that account identifier is on the presentation instrument or is on the carrier.

* * * * *